SYNCHRONIZING CIRCUIT

Filed Aug. 10, 1967

INVENTOR
Karl B. Avellar

BY Donald R. Lackey
ATTORNEY 3,504,200

SYNCHRONIZING CIRCUIT

Karl B. Avellar, Ellicott City, Md., assignor to Westinghouse Electric Corporation, Pittsburgh, Pa., a corporation of Pennsylvania Filed Aug. 10, 1967, Ser. No. 659,648
Int. Cl. H03k 5/00
U.S. Cl. 307—269 10 Claims

ABSTRACT OF THE DISCLOSURE

A synchronizing circuit for selectively initiating one or more functions in a digital system controlled by a system clock. The synchronizing circuit provides a single pulse, in synchronism with the system clock, in response to the actuation of a push button, and then automatically resets the circuit to await the next actuation of a push button.

BACKGROUND OF THE INVENTION

Field of invention

This invention relates in general to synchronizing circuits, and more particularly to synchronizing circuits of the type which provides a single pulse having a predetermined pulse width, for initiating a function in a digital system, synchronized with the system clock.

Description of the prior art

The selective initiation of one or more functions in a synchronous digital system, presents problems in electrical design and cost. Special care is required due to the uncertainty in time of a switch contact closing, and to the uncertainty in logic levels due to contact bounce. It is usually required that a system function be initiated with a single pulse having a predetermined pulse width, rather than a chain of pulses, and to accomplish this requires a synchronizing circuit and a count-one circuit. The circuitry used must protect against gate "slivers," which cause unreliable operation by generating signals with marginal pulse widths.

In the prior art, these functions are usually performed with one-shot circuits, core switches, counting delays, or triggering the clock generator. Core switching and one-shot circuits generate a noise free signal of a known pulse width, and these signals may be synchronized with clocked flip-flop circuits by various known arrangements. Core switches and one-shot circuits, along with their synchronizing circuitry, are costly. Further, when a plurality of digital functions are to be selectively initiated and synchronized, each function requires a core switch or one-shot circuit, along with its synchronizing circuitry, greatly multiplying the system cost. An alternative would be to use rotary switches for each function identification, and one core switch with gating, but the awkwardness of this operation, along with the possibility of human error, offset the advantages of this approach.

Counting for an interval after a switch is initiated can be used to avoid contact bounce. In slow systems, such 10 kHz. to 50 kHz., only a few flip-flop circuits are required to provide an adequate delay. When clock rates become fast, however, an excessive number of flip-flop circuits are required to generate the required delay.

SUMMARY OF THE INVENTION

This invention overcomes the hereinbefore mentioned disadvantages of prior art synchronizing circuits, by a new and improved synchronizing circuit which makes it possible to utilize an inexpensive push button to initiate a digital function. Further, the new synchronizing circuit facilitates multi-function control, as each function to be initiated requires only a push button and a gate, with all functions utilizing the synchronizing circuitry.

More specfically, the synchronizing circuit utilizes a push button having normally closed and normally open contacts, and first and second level shifter means associated with the normally closed and normally open contacts, respectively, for each digital function to be initiated. When a push button is not actuated, its normally closed contact sets a first flip-flop circuit to provide an enabling signal for gating means in the synchronizing portion of the circuit. When a push button is actuated, the co-existence of the enabling signal from the first flip-flop circuit, a new logic signal level from the second level shifter means, initiated by the normally open contact of the push button closing, and a signal from an off clock, which generates a pulse in the off time of the digital system clock, provides a gated pulse which switches a second flip-flop circuit. A third flip-flop circuit is connected to be responsive to the second flip-flop circuit, with the third flip-flop circuit changing its output state upon the first system clock pulse following the switching of the second flip-flop circuit. The third flip-flop circuit provides a single pulse having a predetermined pulse width, for initiating the selected digital function. The third flip-flop circuit also provides output signals which switch the first flip-flop means, to remove the enable signal from the gating means and insure that only one output pulse is generated, to switch the second flip-flop means, and to arm the third flip-flop means to allow it to switch upon the first system clock pulse after the second flip-flop circuit switches. When the push button returns to its unactuated position, the first flip-flop circuit is switched back to its set output by the closing of the normally closed contact.

If the synchronizing circuit is to be used to selectively initiate a plurality of digital functions, means responsive to the first level shifter means directs the output pulse of the third flip-flop means to the selected function.

BRIEF DESCRIPTION OF THE DRAWINGS

Further advantages and uses of the invention will become more apparent when considered in view of the following detailed description and drawings, in which.

DESCRIPTION OF THE PREFERRED EMBODIMENTS

Figure 1:
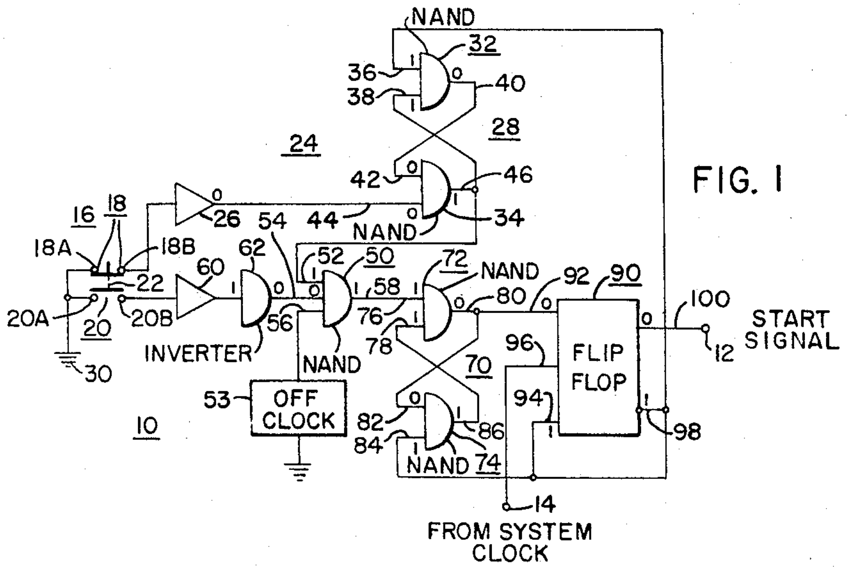
FIGURE 1 is a schematic diagram of a synchronizing circuit constructed according to the teachings of the invention.

Referring now to the drawings, and FIG. 1 in particular, there is shown a synchronizing circuit 10 constructed according to the teachings of the invention. For purposes of example, the drawings illustrate positive logic i.e., the voltage level representing the "one" state is more positive than the voltage level representing the "zero" state, and NAND gates to illustrate the teachings of the invention. It is to be understood, however, that other forms of logic may be used. For example, with positive logic, AND gates with inverters may be used. If negative logic is used, in which case the voltage level representing the "one" state is less positive than the voltage level representing the "zero" state, NOR gates may be utilized, or OR gates with inverters may be used. Further, it is to be understood that the various logic functions shown in the figures may be formed of discrete components, or in integrated circuit form, or both.

More specifically, the function of the synchronizing circuit 10 shown in FIG. 1 is to provide a single pulse having a predetermined pulse width, at output terminal 12, synchronized with a signal applied to terminal 14 from the system clock of the digital system whose function, or functions, are to be selectively initiated, after switching means 16 is actuated.

Synchronous circuit 10 removes the criticality of the point in time when switching means 16 is actuated, and eliminates the problem of contact bounce, as will be hereinafter explained. Thus, switching means 16 may be an inexpensive pushbutton, having a normally closed contact 18, which has stationary contacts 18A and 18B, and a normally open contact 20, which has stationary contacts 20A and 20B, with the stationary contacts being engaged by a movable member 22 arranged to be of the break-before-make type. In other words, it is important that when member 22 of pushbutton 16 is actuated, that normally closed contact 18 opens before normally open contact 20 closes.

The normally closed contact 18 of pushbutton 16 controls an enabling circuit 24, which includes level shifter means 26, and flip-flop means 28. Enabling circuit 24 is necessary to insure that synchronous circuit 10 will provide only one pulse when the push button 16 is actuated. The circuitry of level shifter means 26 will depend upon the type of logic utilized, which in this example will be assumed to be positive DTL logic, having logic levels of +6 volts, which indicates the "one" state, and ground, which indicates the "zero" state. Level shifter means 26 may be a resistor connected from normally closed contact 18B to a source of +6 volts potential, and contact 18A may be connected to ground 30. Thus, when normally closed contact 18 is closed, the output of level shifter 26 will be at ground potential, and when contact 18 is open, the output of level shifter 26 will be at +6 volts.

Flip-flop means 28 of the enabling circuit 24 may be two cross-connected NAND gates 32 and 34, which form a set-reset flip-flop circuit of the RS type. An input to the NAND gate which will change its output will flip or switch the output state of the flip-flop circuit. NAND gate 32 has inputs 36 and 38, and an output 40, and NAND gate 34 has inputs 42 and 44, and an output 46. The output 40 of NAND gate 32 is connected to input 42 of NAND gate 34, the output 46 of NAND gate 34 is connected to the input 38 of NAND gate 32, with the input 44 of NAND gate 34, and the input 36 of NAND gate 32, forming the set and reset inputs, respectively. The output 46 of NAND gate 34 provides an enabling signal for the synchronizing portion of the circuit, when the output of NAND gate 34 is at the "one" logic level. When push button 16 is unactuated, the "zero" logic level provided by level shifter means 26 sets flip-flop 28 into the state indicated in FIG. 1, with the set output 46 being a "one."

In addition to the necessity of providing a pulse from synchronizing circuit 10 that is in synchronism with the system clock of the digital function to be initiated, it is essential that the pulse produced be of a predetermined pulse width. In other words, pulse slivers in synchronism with the system clock are unsatisfactory because of their unreliability in initiating the desired function. In order to prevent pulse slivers, and insure that the pulse produced by synchronizing circuit 10 has a predetermined pulse width, a NAND gate 50 and off clock 53 are utilized which cooperate with the enabling signal from enabling circuit 24 to gate a signal when initiated by push button 16, only upon the coexistence of a signal initiated by push button 16, an enabling signal from enabling circuit 24, and a pulse from the off clock 53. The off clock 53 generates a pulse during each off time of the system clock, thus timing the output of NAND gate 50 to always occur during the off time of the system clock.

NAND gate 50 has inputs 52, 54 and 56, and an output 58, with input 52 being responsive to the output 46 of flip-flop 28 in the enabling circuit 24, input 54 being responsive to the push button 16, and input 56 being responsive to the off clock 53.

Push button 16 provides logic signals to input 54 via normally open contact 20, level shifter means 60, and an inverter 62, which may be a NAND gate. Level shifter means 60 may be similar to level shifter means 26, hereinbefore described, such as a resistor having one end connected to contact 20B, and the other end connected to a source of +6 volts potential. Contact 20A is connected to ground 30. Thus, when the normally open contact 20 is open, level shifter means 60 applies a "one" logic level signal to inverter 62, which outputs a "zero" logic level signal into the input 54 of NAND gate 50. Thus, the "one" enabling signal at input 52, and the timed "ones" from the off clock 53, will not change the output level of NAND gate 50, as a "zero" logic level is applied to input 54.

When push button 16 is actuated, normally closed contact 18 will open before the normally open contact closes, removing the set input to flip-flop means 28, and changing the logic level to input 44 of NAND gate 34 to a "one". Since a "zero" is still applied to input 42, the state of flip-flip 28 will not change. However, it is no longer clamped, and a "zero" applied to input 36 of NAND gate 32 will switch it, as will be hereinafter explained.

After normally closed contact 18 opens, normally open contact 20 will close, causing level shifter means 60 to output a "zero," which is changed to a "one" by inverter 62. Thus, NAND gate 50 will have a "one" at both inputs 52 and 54, and the first "one" applied to input 56 by off clock 23 will cause NAND gate 50 to change its output level to a "zero."

The output 58 of NAND gate 50 is applied to flip-flop means 70, with the change in the output level of NAND gate 50 causing flip-flop means 70 to change its output state. Flip-flop means 70 may be a set-reset flip-flop circuit of the RS type, similar to flip-flop means 28, having two cross-connected NAND gates 72 and 74. NAND gate 72 has inputs 76 and 78, and an output 80, and NAND gate 74 has inputs 82 and 84, and an output 86. Output 86 of NAND gate 74 is connected to the input 78 of NAND gate 72, and output 80 of NAND gate 72 is connected to the input 82 of NAND gate 74. Inputs 76 and 84 provide the set and reset inputs, and output 80 is used as the useful output. The reset state of flip-flop means 70 is as shown in FIG. 1, with output 80 being at the "zero" level. When NAND gate 50 outputs a "zero" into the set input 76 of NAND gate 72, flip-flop means 70 changes its output state, with output 80 changing to a "one," and this "one" changes the output 86 to a "zero."

Since the "zero" output level of NAND gate 50 is not held, flip-flop means 70 is used to "remember" the change in the output state of NAND gate 50, and the change in the output state of flip-flop means 70, in response to a change in the output state of NAND gate 50, is used to change the output state of flip-flop means 90, upon the first pulse from the system clock after flip-flop means 70 changes its output state.

Flip-flop means 90, which may be of the JK type, has set and reset inputs 92 and 94, respectively, and a trigger input 96. Trigger input 96 is connected to terminal 14, and thus to the system clock, with flip-flop means 90 changing its output state when triggered by the system clock, only when a logical "one" is present at the desired input, 92 or 94, or both simultaneously.

Flip-flop means 90 has two useful outputs, 98 and 100. Output 98 is used to provide reset pulses, and output 100 is connected to terminal 12, and provides the start signal for the selected digital function. When push button 16 is unactuated, flip-flop means 90 has a "one" output at output 98, and a "zero" output at output 100. Output 98 is connected to the reset input 84 of flip-flop means 70, to the reset input 36 of flip-flop means 28, and to its own reset input 94. The output 80 of flip-flop means 70 is connected to the input 92 of flip-flop means 90, and thus flip-flop means 90 has a "zero" and a "one" at its set and reset inputs, 92 and 94, respectively.

When push button 16 is actuated and NAND gate 50 outputs a "zero" to switch the output state of flip-flop means 70, the "one" output of NAND gate 72 sets flip-flop means 90 such that the next system clock pulse will cause flip-flop means 90 to change its output state. A "one" thus appears at output 100 and at terminal 12, which initiates the selected digital function. The pulse width of the output signal is limited to a predetermined value, however, as the change in the output state of flip-flop 90 at its output 98 resets flip-flop 70. Flip-flop 70, therefore, again outputs a "zero" to the input 92 of flip-flop means 90, and since flip-flop 90 had changed its own reset input 94 to a zero, on the next system clock pulse, flip-flop means 90 will switch back to its original state, terminating the output pulse.

Output 98 of flip-flop means 90 is also connected to the reset input 36 of flip-flop means 28, causing flip-flop means 28 to change its output state and remove the enabling signal from NAND gate 50. Thus, holding push button 16 in the actuated position will not cause additional pulses to be generated by flip-flop means 90. As soon as push button 16 returns to its unactuated position, the set input will again be applied to input 44 of flip-flop means 28, causing it to switch back to its original state in which its output is clamped, which will again enable NAND gate 50, arming it for the next operation of push button 16.

Figure 2:
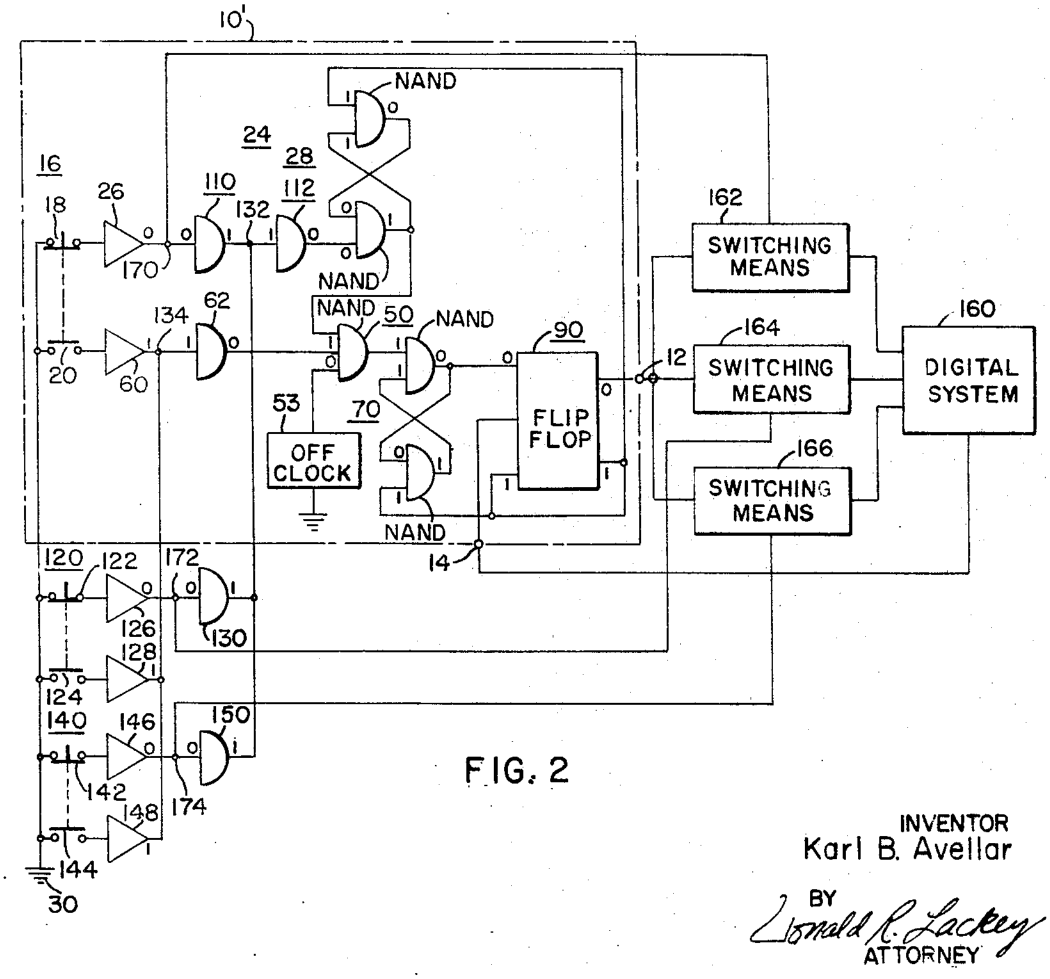
FIG. 2 is a schematic diagram of a multi-function embodiment of the synchronous circuit shown in FIG. 1.

Thus, the synchronizing circuit 10 will provide a single pulse, having a predetermined pulse width, synchronized with the system clock of the digital system to be initiated, using a conventional low cost push button to initiate the command. Further, the synchronizing circuit 10 shown in FIG. 1 may use the same types of circuits used in the digital system to be initiated, it requires a minimum of circuitry, it is fast operating and reliable, and may be manufactured at a relatively low cost. In addition to these advantages, synchronizing circuit 10 lends itself to selectively initiating any number of digital functions, requiring only the addition of a push button, associated level shifters, and an inverter for each function added. The same synchronizing circuitry is utilized for each function, regardless of the number of functions to be controlled. FIG. 2 illustrates a multifunction embodiment of the invention, with like reference numerals in FIGS. 1 and 2 indicating like components. While FIG. 2 illustrates a three function arrangement, this is for purposes of example only, as it will be apparent that any desired number of functions may be accommodated.

More specifically, FIG. 2 illustrates a synchronizing circuit 10' which is the same as synchronizing circuit 10 shown in FIG. 1 hereinbefore described, except modified by the addition of two series connected inverters 110 and 112 connected between level shifter means 26 and flip-flop means 28. Inverters 110 and 112 have no effect on the hereinbefore described operation of enabling circuit 24, since two series connected inverters will output the input, but they are necessary in order to separate the commands to the digital functions, as will be hereinafter explained.

The basic synchronizing circuit 10' of FIG. 2, hereinbefore explained, provides a synchronizing circuit for one function through its push button 16. A second function requires a push button 120 having a normally closed contact 122 and a normally open contact 124, similar to push button 16, level shifters 126 and 128, and an inverter 130. Normally closed contact 122, level shifter means 126 and inverter 130 are serially connected, in that sequence, between ground 30 and the junction 132 between inverters 110 and 112 in synchronizing circuit 10'. Normally open contact 124 and level shifter means 128 are serially connected, in that order, between ground 30 and the junction 134 between level shifter means 60 and inverter 62 in synchronizing circuit 10'. Level shifter means 126 and 128 may be similar to level shifter means 26 and 60, hereinbefore described.

Additional functions are all added in a similar manner. For example, as shown in FIG. 2, a third function may be added by a push button 140 having a normally closed contact 142 and a normally open contact 144, level shifter means 146 and 148, and an inverter 150. The normally closed contact 142, level shifter means 146 and inverter 150 are serially connected, in that sequence, between ground 30 and junction 132; and, normally open contact 144 and level shifter means 148 are serially connected, in that sequence, between ground 30 and junction 134.

Some means must be provided to direct the starting signal from terminal 12 to the selected function in the digital system, such as digital system 160. This may be accomplished by using the change in the output level of the level shifter means associated with the enabling circuit 24, to select its associated function, and direct the starting signal thereto. For example, the output terminal 12 may be connected to logic or switching means 162, 164 and 166, which are associated with the digital functions in digital system 160 which push buttons 16, 120 and 140 are to initiate. Then, the outputs of level shifter means 26, 126 and 146 may be connected to switching means 162, 164 and 166, respectively, such that when the logic level of the selected level shifter means changes, it will direct the output signal from terminal 12 to the selected function.

As shown in FIG. 2, this logic level for directing the starting signal to the selected function is taken from the junction between the level shifter means and the inverter associated with the normally closed contact of the push button. The logic level for the first function is taken from junction 170 between level shifter means 26 and inverter 110, the logic level for the second function is taken from junction 172 between level shifter means 126 and inverter 130, and the logic level for the third function is taken from junction 174 between level shifter means 146 and inverter 150.

The inverters 110, 130 and 150 are necessary in order to isolate the signals distributed to the various digital functions to be selectively initiated, from the signals applied to the enabling circuit flip-flop means 28. Inverter 112 is thus required to invert the inverted signals, for proper operation of the synchronizing circuit. If the outputs of level shifter 26, 126 and 146 were to be tied together without inverters 110, 130 and 150, it would not be possible to determine which of the functions the starting signal should be directed to.

In the operation of the multi-function synchronizing circuit shown in FIG. 2, the actuation of any push button will immediately change the output of the level shifter associated with the normally closed contact, which change in output logic level will immediately select the function the output pulse should be directed to. For example, assume that push button 140 is actuated. The output of level shifter 146 will change from a "zero" to a "one," which change will select switching means 166. Junction 132, which was at the "one" level, will now be grounded by inverter 150, and will therefore change to the "zero" level. Inverter 112 will change the "zero" to a "one," and the set input will be removed from flip-flop means 28, as hereinbefore described relative to FIG. 1. When push button 140 closes its normally open contact 144, level shifter 148 will output a "zero," grounding junction 134, inverter 62 will output a "one," and the NAND gate 50 will change its output level, causing flip-flop means 70 to change its output level, which in turn causes flip-flop means 90 to change its output state, applying a pulse to terminal 12 and through the selected switching means 166 to the associated digital function in the digital system 160. Flip-flop means 90 will switch flip-flop means 28, to remove the enabling signal from NAND gate 50, it will switch flip-flop 70 back to its original output state, and it will arm itself, causing it to switch back to its original output state upon the first system clock pulse applied to terminal 14 from digital system 160, after flip-flop means 70 switches to its original output state. Flip-flop means 28 will switch back to its set output when push button 140 returns to is unactuated position.

Thus, in summary, there has been disclosed a new and improved synchronizing circuit which is reliable, fast acting, uses the same type of circuitry as the controlled digital system, provides a single pulse of predetermined duration, synchronized with the digital system clock, and the synchronizing system automatically resets itself after each operation. Further, the synchronizing circuit may be used to selectively initiate a plurality of digital functions, while using the same basic synchronizing circuitry for each function. All that is required to add a function is to add a push button with its associated level shifters, and an inverter. Also, for multifunction operation, an inverter is added in the synchronizing circuit to return the inverted signals to their original logic levels.

Since numerous changes may be made in the above described apparatus and different embodiments of the invention may be made without departing from the spirit thereof, it is intended that all matter contained in the foregoing description or shown in the accompanying drawings, shall be interpreted as illustrative, and not in a limiting sense.

I claim as my invention:

1. A synchronizing circuit for initiating at least one function in a digital system synchronized by a system clock, comprising:

switching means having normally closed and normally open contacts, actuable when it is desired to initiate the digital system, first and second signal means providing predetermined logic level signals responsive to the operating state of said normally open and normally closed contacts, respectively, clock means, gating means, and first, second and third flip-flop means each having first and second operating states, said first, second and third flip-flop means being in their first operating state when said switching means is in its unactuated state, said first flip-flop means being responsive to said first signal means, with said first flip-flop means being set in its first operating state when said normally closed contact is closed, and being armed when said normally closed contact opens, said gating means being responsive to said first flip-flop means, said second signal means, and said clock means, providing a change in its output signal level upon the co-existence of:

(a) an enabling signal provided by said first flip-flop means when it is in its first operating state, (b) a pulse from said clock means, and (c) a change in the signal level of said second signal means when said switching means is actuated to close its normally open contact, said second flip-flop means being responsive to said gating means, switching to its second operating state when the output signal level of said gating means changes, said third flip-flop means being responsive to said second flip-flop means and to the system clock, switching to its second operating state in response to the second operating state of said second flip-flop means and a pulse from the system clock, said third flip-flop means providing signals when it switches to its second operating state for:

(a) initiating said digital system, (b) switching said armed first flip-flop means to its second operating state to remove the enabling signal from said gating means, (c) switching said second flip-flop means back to its first operating state, and (d) arming said third flip-flop means to switch back to its first operating state upon the first system clock pulse after said second flip-flop means switches back to its first operating state, said first signal means switching said first flip-flop means back to its first operating state when said switching means returns to its unactuated state.

2. The synchronizing circuit of claim 1 wherein said switching means is of the break-before-make type.

3. The synchronizing circuit of claim 1 wherein said clock means provides pulses during the off times of the system clock.

4. The synchronizing circuit of claim 1 wherein said switching means is a push button and said first and second signal means are level shifters which provide first and second logic levels corresponding to whether its associated push button contact is open or closed.

5. The synchronizing circuit of claim 1 wherein a plurality of functions in the digital system are to be selectively initiated by said third flip-flop means, including one of said switching means for each function to be initiated, one of each of said first and second signal means for each of said switching means, each responsive to the normally closed and normally open contacts, respectively, of its associated switching means, and means responsive to the first signal means associated with each of said switching means for directing the initiating signal provided by said third flip-flop means to the selected function.

6. The synchronizing circuit of claim 5 wherein a change in the output signal level of any of the second signal means changes the output signal level applied to said gating means.

7. The synchronizing circuit of claim 6 wherein the change in the output signal level of any of said first signal means changes the output signal level applied to said first flip-flop means, and including isolating means for separating the signals from each of said first signal means which are applied to said first flip-flop means, and which select the function to which the initiating signal from said third flip-flop means is directed.

8. A synchronizing circuit for initiating a digital system synchronized by a system clock, comprising:

push button means having a normally closed and a normally open contact, said push button means being of the break-before-make type, and being actuable when it is desired to initiate the digital system, first and second level shifter means connected to said normally closed and normally open contacts, respectively, providing signals at predetermined logic levels responsive to the state of its associated contact, gating means having a plurality of inputs and an output, clock means providing pulses during the off time of the system clock of the digital system, first and second flip-flop means, each having set and reset inputs, and an output, and third flip-flop means having set, reset, and trigger inputs, and set and reset outputs, the set input of said first flip-flop means being connected to said first level shifter means, and the output of said first flip-flop means being connected to an input of said gating means, said first flip-flop means providing an enabling signal for said gating means in its set operating state, said second level shifter means and said clock means being connected to inputs of said gating means, with said gating means changing its output signal level upon the co-existence of an enabling signal from said first flip-flop means, a change in the output level of said second level shifter means, and a signal from said clock means, the output of said gating means being connected to the set input of said second flip-flop means, the output of said second flip-flop means being connected to the set input of said third flip-flop means, the trigger input of said third flip-flop means being adapted for connection to the system clock, the reset output of said third flip-flop means being connected to the reset inputs of said first, second and third flip-flop means, and the set output of said third flip-flop means being adapted for connection to the digital system to be initiated, whereby the gating of said gating means sets said second flip-flop means, said second flip-flop means sets said third flip-flop means on the first system clock signal after said second flip-flop means sets, said third flip-flop means provides a pulse at its set output for initiating the digital system, the reset output of said third flip-flop means resets the first flip-flop means to remove the enabling signal from said gating means, resets the second flip-flop means, and arms the third flip-flop means to reset on the next system clock signal after the second flip-flop means resets, said first flip-flop means resetting when said push button means returns to its normal operating position.

9. The synchronous circuit of claim 8 wherein a plurality of functions in the digital system are to be selectively initiated by said third flip-flop means, including one of said push button means for each function to be initiated, one of each of said first and second level shifter means for each of said push button means, each responsive to the normally closed and normally open contacts, respectively, of its associated push button means, and means responsive to the first level shifter means associated with each of said push button means for directing the initiating signal provided by said third flip-flop means to the selected function.

10. The synchronizing circuit of claim 9 wherein a change in the output signal level of any of said second level shifter means changes the signal level applied to said gating means, a change in the output signal level of any of said first level shifter means changes the signal output level applied to said first flip-flop means, and including isolating means for separating the signals from each of said first level shifter means which are applied to said first flip-flop means, and which select the function to which the initiating signal from said third flip-flop means is directed.

References Cited

UNITED STATES PATENTS

| | | | |
|---|---|---|---|
| 3,124,705 | 3/1964 | Gray | 307—265 XR |
| 3,163,824 | 12/1964 | Crain | 328—201 XR |

DONALD D. FORRER, Primary Examiner

STANLEY T. KRAWCZEWICZ, Assistant Examiner

U.S. Cl. X.R.

307—265; 328—63, 201